Patented Apr. 18, 1933

1,904,604

UNITED STATES PATENT OFFICE

HANS BAEHR, OF LUDWIGSHAFEN-ON-THE-RHINE, GERMANY, ASSIGNOR TO I. G. FARBENINDUSTRIE AKTIENGESELLSCHAFT, OF FRANKFORT-ON-THE-MAIN, GERMANY

PROCESS OF PRODUCING AMMONIUM SULPHATE

No Drawing. Application filed July 14, 1930, Serial No. 467,968, and in Germany July 29, 1929.

The present invention relates to the purification of gases from sulphur compounds with the production of ammonium sulphate.

It has already been proposed to purify gases containing sulphur by passing them at elevated temperatures, if necessary with the addition of oxygen or gases containing oxygen, over catalysts, the hydrogen sulphite being thus converted into sulphur dioxide which is then recovered together with ammonia in the form of the sulphurous acid salts of ammonia. Various methods have been suggested for converting these into a marketable product; for example by heating ammonium bisulphite or a mixture of ammonium sulphite and ammonium bisulphite in the ratio of 1 to 2, ammonium sulphate and sulphur are obtained. This reaction has the objection that it frequently proceeds as vigorously as if an explosion would take place, and, moreover, at the high temperatures employed the material of the vessels is attacked. A further objection to this reaction consists in the fact that only salt mixtures which contain 2 molecular proportions of bisulphite or the corresponding amount of an acid to each molecular proportion of sulphite may be employed. When employing this reaction for working up the sulphite mixtures arising from gas purification, especially from the purification of illuminating and coke-oven gases, it is necessary for the ratio of the quantities of ammonia and hydrogen sulphide in the initial gas to amount to at least 4 to 3 since with a smaller content of hydrogen sulphide in the gases the ammonium sulphite liquors obtained can be only incompletely converted into sulphate and sulphur; in order to ensure complete conversion of the sulphite in this case, a corresponding amount of acid would have to be added. Now, the ratio of the quantities of ammonia and hydrogen sulphide in illuminating gas and coke-oven gas varies in each case, and in most cases amounts to from 2 to 1 up to 2 to 1.2, so that the pressure conversion of the sulphite-bisulphite for the production of sulphate and sulphur is therefore not possible without the addition of acid. On the other hand, the amount of sulphur present in the said gases is frequently insufficient to render possible an advantageous working up into polythionates or thiosulphate according to other methods already known. The ratio of the quantities of ammonia and hydrogen sulphide in this case must amount to at least 2 to 2.5 and therefore only gases with an extremely high content of sulphur or gases which are poor in or free from ammonia are suitable. With the ammonium sulphite prepared from sulphur dioxide obtained by catalytic methods from illuminating gas and coke-oven gas these reactions cannot be carried out without the additions of acids or acid salts which render the process more expensive.

I have now found that the purification of gases containing sulphur, for the purpose of recovering sulphates, by catalytically converting the hydrogen sulphide into sulphur dioxide, and further working up the dissolved or solid sulphites obtained therefrom by absorption with alkaline solutions, in particular ammoniacal solutions, into sulphates, may be carried out in an advantageous manner, by converting the liquors containing mainly neutral ammonium sulphite by heating them under pressure with the formation of ammonium sulphate and ammonium sulphide and separating the latter in the form of ammonia and hydrogen sulphide from the sulphate liquor by boiling or blowing with steam, the ammonia and hydrogen sulphide being then worked up in any suitable manner. The expelled gases are preferably introduced into the gas to be purified before the gas reaches the catalyst, or they are introduced into the ammonia distiller, which serves for the recovery of ammonia from the gas water obtained by cooling the crude initial gas. In the distiller, the ammonia and the hydrogen sulphide are expelled and preferably added to the gas before or after the catalytic treatment. The ammonia then serves for the formation of ammonium sulphite or bisulphite, while the hydrogen sulphide, if added before the catalytic treatment, is converted into sulphur dioxide, or, if added only after the catalytic treatment, is bound by the washing liquors containing sulphite and/or bisulphite in the form of thiosulphate.

Liquors suitable for the process according to the present invention are obtained for example when the ratio of the quantities of ammonia and hydrogen sulphide in the gas to be purified is greater than 4 to 3. The heating under pressure is preferably effected at temperatures of about 200° C. because then a practically complete conversion into sulphate and ammonium sulphide takes place. If desired, the heating operation may be carried out in a continuous manner. When the ratio of the quantities of ammonia and hydrogen sulphide or of ammonia and sulphur dioxide is about 2 to 1 the reaction proceeds according to the following equation:

$$4(NH_4)_2SO_3 = 3(NH_4)_2SO_4 + (NH_4)_2S.$$

The ammonium sulphide formed is not a troublesome by-product because it may be employed in an advantageous manner for maintaining a satisfactory ratio between the amounts of ammonia and hydrogen sulphide in the gases to be purified. In order to recover the ammonium sulphide formed the sulphate liquor is boiled or blown with steam and the ammonium sulphide is then very rapidly evolved in the form of ammonia and hydrogen sulphide. These gases may now be added to the gases to be purified at any place in front of the catalyst so that the hydrogen sulphide is again burned to sulphur dioxide when the gas is passed over the catalyst. On the other hand, if the sulphur content of the gases to be purified is already sufficiently high, the ammonium sulphide, that is the gaseous mixture of ammonia and hydrogen sulphide, is preferably introduced into the ammonia distilling column in which the gas water is subjected to distillation. The ammonia and hydrogen sulphide evolved may then be cooled and scrubbed with aqueous ammonia in the form of gas water. Thereby the bulk of the hydrogen sulphide escapes, while the ammonia is dissolved. The ammonia may then be introduced into the gas stream and the hydrogen sulphide through the deacidifier into the chimney of the plant or may be utilized in any suitable manner; for example, it may be burned to sulphur in the presence of only an amount of oxygen which is insufficient for complete combustion. In addition to the convenient regulation of the ratio of the amounts of ammonia and hydrogen sulphide in the gas to be purified, a further advantage is obtained, in the process according to the present invention by returning the ammonium sulphide to the crude gas stream, namely that the sulphur content of the same is thereby increased by about one fourth and thus a correspondingly higher reaction temperature is attained at the catalyst which is very desirable in cases when only a little hydrogen sulphide is present in the crude gas at the start. In this manner, in particular with gases poor in hydrogen sulphide, additional heating is unnecessary or only a slight regeneration of the heat of the gases is sufficient. In the conversion of the liquors there is likewise the particularly favourable effect that in consequence of their alkaline reaction the liquors attack the walls of the vessel less than the acid liquors arising by the conversion of liquors containing large amounts of bisulphite; for example aluminium, or chromium steels, such as that known in the trade as V2A-steel, are very suitable as the constructional materials for the vessels for the conversion. Moreover, the whole of the metals contained in the liquors containing ammonium sulphide are precipitated as sulphides, so that the ammonium sulphate is obtained in a very pure state and may be employed without further purification for example as a fertilizer.

Small amounts of ammonium bisulphite have no injurious effect upon the reaction so that no specially rigid control of the composition of the gases is necessary. The ammonium bisulphite is converted into sulphur and sulphate by the conversion of the liquors, and the sulphur may be separated before evaporating the ammonium sulphate solution. Care must be taken in this case that the content of bisulphite does not become too high because, as has already been stated, such liquors often react very violently during their conversion.

The sulphite liquors arising from the catalytic purification of gases often contain more or less large amounts of thiosulphate. It has been found that the neutral thiosulphate is converted into sulphate, ammonium sulphide and sulphur according to the following equation:

$$4(NH_4)_2S_2O_3 = 3(NH_4)_2SO_4 + (NH_4)_2S + 4S'$$

when heated in a closed tube to from about 200° to 250° C. in the form of the dry salt or if desired in the form of its alkaline solutions, so that the liquors containing thiosulphate may also be worked up according to the present invention. It should be emphasized, however, that this reaction only proceeds in neutral or alkaline solutions; in contrast thereto, the course of the known reactions according to which thiosulphate is subjected to pressure conversion in the presence of acids, is quite different and sulphur as well as sulphate is formed from the thiosulphate according to the following equation:

$$3Na_2S_2O_3 + H_2SO_4 = 3Na_2SO_4 + H_2O + 4S.$$

In order to avoid the presence of any unconverted thiosulphate in the final liquors when working at temperatures below 200° C., a small amount of acid, as for example sulphuric acid, may be added to the liquor after the pressure treatment. In the presence of ammonium bisulphite the thiosulphate is converted into ammonium sulphate and sulphur without the formation of ammonium sulphide.

Catalytically active substances, as for example selenium, tellurium or heavy metal oxides may be added during the pressure heating of the sulphite liquors.

The following examples will further illustrate the nature of this invention, but the invention is not restricted thereto.

Example 1

Coke-oven gas containing 8 grams of ammonia and 9 grams of hydrogen sulphide per cubic metre is cooled, whereby 2.5 grams of ammonia and 1.5 grams of hydrogen sulphide per cubic metre of the gas are dissolved in the condensed water. The gas-water is freed from ammonia and hydrogen sulphide in a distilling column and these gases are introduced into the crude gas in front of the gas cooler. When the gases then pass into the cooler, mainly the water is separated, whereas only small quantities of the ammonia and hydrogen sulphide are dissolved therein. The cooled gas is preheated to about 320° C. in a heat exchanger and led over a catalyst consisting of nickel oxide, the hydrogen sulphide thus being converted into sulphur dioxide. After cooling the gas is washed with water or an ammonium sulphite liquor and this is heated in a pressure vessel to 200° C. and thus the conversion of the liquor into sulphate and ammonium sulphide is effected. The resulting liquor is then blown with steam and the hydrogen sulphide which escapes together with ammonia is returned to the gas stream before the cooler. Thereby the content of hydrogen sulphide in the gas to be treated is increased to 11 grams of hydrogen sulphide per cubic metre and by the conversion thereof at the catalyst the reaction temperature is increased to about 110° C. above the temperature of the gases when entering the catalyst, while the increase in temperature effected with the original gas containing 8 grams of hydrogen sulphide per cubic metre amounts to about 80° C. above the said initial temperature.

Example 2

Illuminating gas containing 8 grams of ammonia and 12 grams of hydrogen sulphide per cubic metre is cooled and the gas water, which contains dissolved therein 2.5 grams of ammonia and 2 grams of hydrogen sulphide per litre of the gas, is distilled. The ammonia is separated from the hydrogen sulphide in the manner described above in the so-called deacidifier and is returned to the gas stream, while the hydrogen sulphide is led into the chimney of the plant. The catalytic treatment of the gas is carried out as described in Example 1 and an ammonium sulphite liquor is obtained which contains 100 per cent of ammonium bisulphite as well as about 90 per cent of ammonium sulphite. This liquor is forced continuously through a layer of sulphur, heated to about 200° C., kept under pressure in a closed vessel and the ammonium sulphite is thus converted into ammonium sulphate and ammonium sulphide. At the same time a little sulphur is formed which remains in the layer of sulphur. When the converted liquor issues from the pressure vessel the ammonium sulphide is expelled by boiling and the vapours are returned to the gas stream before the cooler. The ammonium sulphate solution, after filtration, is worked up into solid ammonium sulphate by evaporation or by salting out for example with solid ammonium sulphite.

Example 3

Brown coal producer gas containing 15 grams of hydrogen sulphide per cubic metre is cooled to about 300° C. After the addition of from 10 to 12 per cent by volume of air the gas is led over a catalyst consisting of nickel oxide on pumice, the hydrogen sulphide thus being converted into sulphur dioxide. After cooling the gas to about 40° C. it is led through a tower through which ammonium sulphite is trickling and the sulphur dioxide is thus combined in the form of ammonium bisulphite. Ammonia is then led into the container in which the liquor is collected and the ammonium bisulphite is thus converted into ammonium sulphite and this may then serve as the washing liquor for the gas containing sulphur dioxide. During circulation the concentration of the sulphite and bisulphite in the liquor increases until it is saturated and then when the ammonia is passed in, the ammonium sulphite, which is somewhat less soluble, is precipitated in the solid form. This salt is filtered off by suction, dissolved in water or in the mother liquor arising from the pressure heating, and this solution is heated in a pressure-tight vessel to about 200° C. The ammonium sulphide thus formed is expelled and returned to the crude gas as described above while the ammonium sulphate is recovered after evaporating the liquor. The salt obtained in this manner has a very beautiful white colour and needs no further purification. This is due to the fact that by separating the ammonium sulphite as the solid salt the contaminating substances arising from the gas, such as tar, pyridine, metal oxides and dust, are retained in the liquor and therefore do not enter the pressure apparatus.

What I claim is:—

1. The process of producing ammonium sulphate which comprises heating an aqueous solution of ammonium sulphite ranging from weakly acid to akaline in the absence of substantial amounts of acid ammonium sulphite under pressure.

2. The process of producing ammonium sulphate which comprises heating an aqueous solution of ammonium sulphite ranging from weakly acid to alkaline in the absence of substantial amounts of acid ammonium sulphite under its own vapour pressure.

3. The process of producing ammonium sulphate which comprises heating an aqueous solution of ammonium sulphite ranging from weakly acid to alkaline in the absence of substantial amounts of acid ammonium sulphite to about 200° C. under its own vapour pressure.

4. The process of producing ammonium sulphate which comprises heating an aqueous solution of ammonium sulphite ranging from weakly acid to alkaline in the absence of substantial amounts of acid ammonium sulphite to about 200° C. under its own vapour pressure and expelling ammonia and hydrogen sulphide from the resulting solution.

In testimony whereof I have hereunto set my hand.

HANS BAEHR.